US012189832B2

(12) United States Patent
Boehm et al.

(10) Patent No.: US 12,189,832 B2
(45) Date of Patent: Jan. 7, 2025

(54) SAFETY AND SECURITY FOR MEMORY

(71) Applicant: Micron Technology, Inc., Boise, ID (US)

(72) Inventors: Aaron P. Boehm, Boise, ID (US); Lance W. Dover, Fair Oaks, CA (US); Steffen Buch, Munich (DE)

(73) Assignee: Micron Technology, Inc., Boise, ID (US)

( * ) Notice: Subject to any disclaimer, the term of this patent is extended or adjusted under 35 U.S.C. 154(b) by 512 days.

(21) Appl. No.: 17/396,531

(22) Filed: Aug. 6, 2021

(65) Prior Publication Data
US 2022/0058295 A1 Feb. 24, 2022

Related U.S. Application Data

(60) Provisional application No. 63/068,046, filed on Aug. 20, 2020.

(51) Int. Cl.
*G06F 21/79* (2013.01)
*G06F 21/60* (2013.01)
(Continued)

(52) U.S. Cl.
CPC ........... *G06F 21/79* (2013.01); *G06F 21/602* (2013.01); *H04L 9/0643* (2013.01);
(Continued)

(58) Field of Classification Search
CPC ... H04L 9/0643; H04L 9/0819; H04L 9/3242; H04L 9/0897; G06F 21/602; G06F 21/64;
(Continued)

(56) References Cited

U.S. PATENT DOCUMENTS 9,189,409 B2 * 11/2015 Maharana ........... G06F 12/0871
10,257,192 B2   4/2019 Shin et al.
(Continued)

FOREIGN PATENT DOCUMENTS

CN   101004772 A * 7/2007 ............. G06F 21/32
CN   101404167 A * 4/2009 ........... G06F 21/445
(Continued)

OTHER PUBLICATIONS

ISA/KR, International Search Report and Written Opinion of the international Searching Authority, Int'l Appl. No. PCT/US2021/045413, Dec. 6, 2021, Korean Intellectual Property Office, Seo-gu, Daejeon, Republic of Korea 10pgs.

*Primary Examiner* — Andrew J Steinle
*Assistant Examiner* — Ali H. Cheema
(74) *Attorney, Agent, or Firm* — Holland & Hart LLP

(57) ABSTRACT

Data associated with a memory device may be authenticated before an associated operation is executed. The data may be authenticated before it is executed at a volatile memory. The data may be associated with a hash (e.g., a first hash) and may be communicated from the memory device to a host device. At the host device, the data and the first hash may be written (e.g., stored) to temporary storage, such as a cache. Once stored to the cache, the host device may generate an additional hash (e.g., a second hash) related to the data using a key inaccessible to the memory device. If the first hash and second hash match, the data may be authenticated and one or more operations may be executed.

23 Claims, 7 Drawing Sheets

(51) Int. Cl.
  *H04L 9/06* (2006.01)
  *H04L 9/08* (2006.01)
  *H04L 9/32* (2006.01)
  *G06F 21/64* (2013.01)
  *G06F 21/72* (2013.01)
  *G06F 21/78* (2013.01)

(52) U.S. Cl.
  CPC .......... *H04L 9/0819* (2013.01); *H04L 9/3242* (2013.01); *G06F 21/64* (2013.01); *G06F 21/72* (2013.01); *G06F 21/78* (2013.01); *H04L 9/0897* (2013.01)

(58) Field of Classification Search
  CPC .......... G06F 21/79; G06F 21/78; G06F 21/72; G06F 21/445; G06F 21/34; G06F 12/14
  See application file for complete search history.

(56) References Cited

U.S. PATENT DOCUMENTS

| | | | |
|---|---|---|---|
| 10,671,544 B2 | 6/2020 | Kim | |
| 10,970,000 B2 * | 4/2021 | Nakano | G06F 3/0659 |
| 2007/0095928 A1 * | 5/2007 | Balinsky | G07F 7/0833 |
| | | | 235/382 |
| 2008/0244244 A1 * | 10/2008 | Tuuk | G06F 11/1064 |
| | | | 712/226 |
| 2010/0281273 A1 * | 11/2010 | Lee | F04B 33/00 |
| | | | 713/193 |
| 2012/0331307 A1 * | 12/2012 | Fernandez | G06F 21/72 |
| | | | 713/190 |
| 2013/0117566 A1 | 5/2013 | Jang et al. | |
| 2013/0318052 A1 * | 11/2013 | Amit | G06F 16/1748 |
| | | | 707/692 |
| 2013/0326154 A1 * | 12/2013 | Haswell | G06F 12/0864 |
| | | | 711/E12.017 |
| 2015/0095661 A1 * | 4/2015 | Sell | G06F 12/1408 |
| | | | 713/193 |
| 2015/0286585 A1 | 10/2015 | Caraccio et al. | |
| 2015/0363594 A1 * | 12/2015 | Hunacek | G06F 21/64 |
| | | | 726/22 |
| 2016/0378687 A1 * | 12/2016 | Durham | H04L 9/3242 |
| | | | 713/193 |
| 2017/0085383 A1 * | 3/2017 | Rao | G06F 21/575 |
| 2018/0188986 A1 * | 7/2018 | Webster | G06F 3/0637 |
| 2018/0203993 A1 | 7/2018 | Bielstein | |
| 2018/0276392 A1 * | 9/2018 | Hoogerbrugge | H04L 9/3236 |
| 2020/0320039 A1 * | 10/2020 | Manningham | G06F 16/1748 |
| 2021/0026966 A1 * | 1/2021 | Ghetie | H04L 9/0631 |
| 2021/0049309 A1 * | 2/2021 | Su | G06F 3/062 |

FOREIGN PATENT DOCUMENTS

| | | | | |
|---|---|---|---|---|
| EP | 2860660 A1 * | 4/2015 | ......... | G06F 12/0802 |
| JP | H076117 A * | 1/1995 | | |
| JP | 2703255 B2 * | 1/1998 | | |
| JP | 2004056620 A * | 2/2004 | ............. | G06F 21/10 |
| JP | 7251540 B2 * | 4/2023 | ........... | G06F 21/105 |
| TW | I464616 B * | 12/2014 | ........... | H04L 9/3263 |
| WO | WO-2008026238 A1 * | 3/2008 | ............... | H04L 9/50 |
| WO | WO-2020019833 A1 * | 1/2020 | ......... | G06F 21/6227 |

* cited by examiner

SAFETY AND SECURITY FOR MEMORY

CROSS REFERENCE

The present Application for Patent claims the benefit of U.S. Provisional Patent Application No. 63/068,046 by BOEHM et al., entitled "SAFETY AND SECURITY FOR MEMORY," filed Aug. 20, 2020, assigned to the assignee hereof, and expressly incorporated by reference herein.

BACKGROUND

The following relates generally to one or more systems for memory and more specifically to safety and security for memory.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
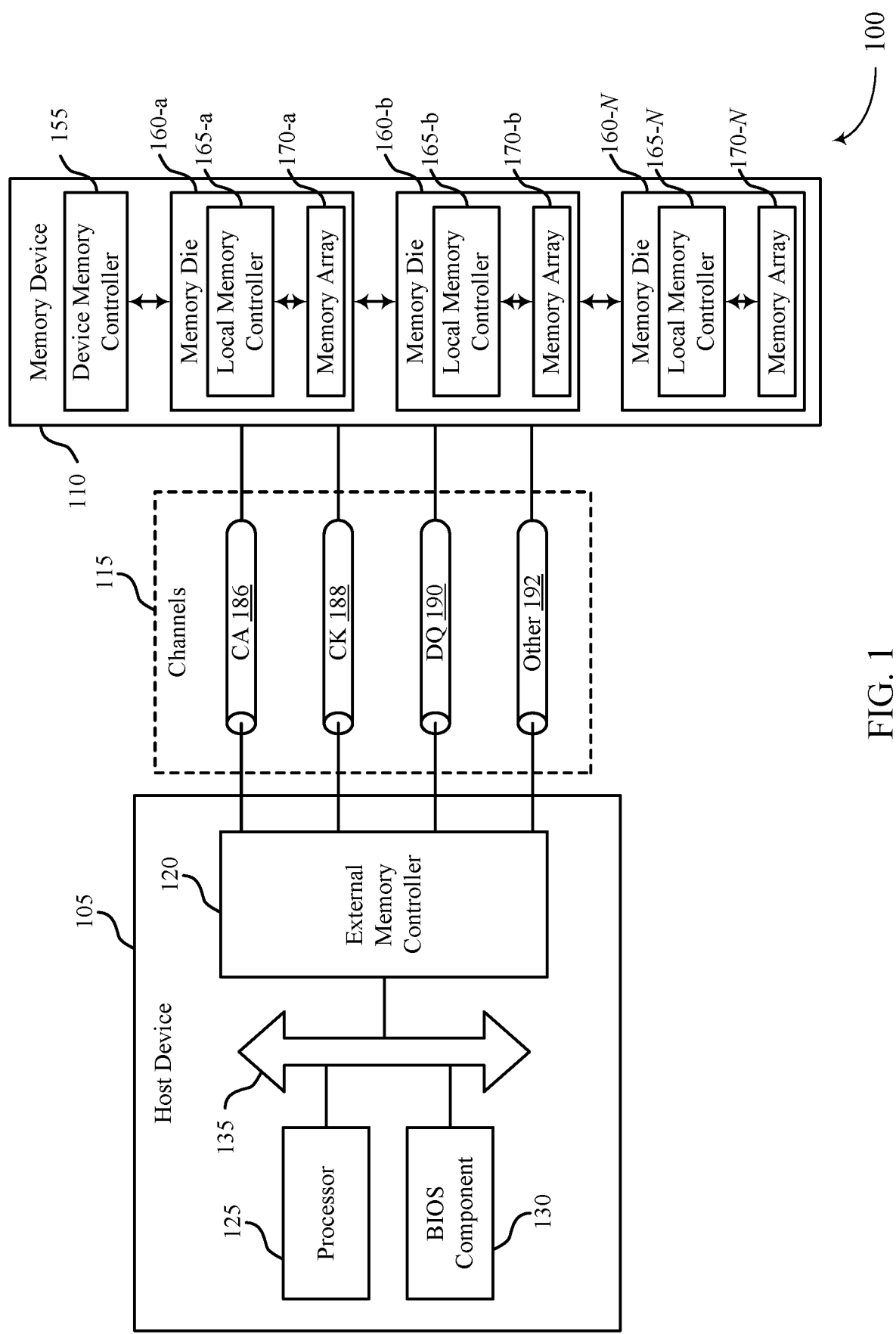
FIG. 1 illustrates an example of a system that supports safety and security for memory in accordance with examples as disclosed herein.

A memory system in accordance with examples disclosed herein may include one or more memory devices and a host device coupled with the one or more memory devices. The one or more memory devices may include different memory technologies, such as volatile memory (e.g., dynamic random-access memory (DRAM)) and non-volatile memory (e.g., flash memory). Some applications, such as vehicle safety systems, autonomous vehicle systems, or other safety-critical systems, may have relatively high reliability and strict time constraints, or may otherwise be designed for a relatively low probability of failures. Accordingly, data stored to the volatile memory and/or non-volatile memory may be authenticated before any operations associated with the data are performed to increase safety and prevent attacks to the data stored.

In some memory systems, data written (e.g., stored) to a memory device may be authenticated upon booting the system (e.g., upon starting a vehicle) using methods such as cyclic redundancy checking (CRC). To authenticate data using CRC, a host device may first calculate a binary sequence (e.g., a first check value). Once the first check value has been generated, data (e.g., a row of data) may be communicated from the memory device to the host device, and the host device may calculate a binary sequence (e.g., a second check value) using the data. If the first and second check values match, the data may be authenticated. During a boot sequence, each row of data of the memory device may be communicated to the host device for authentication, which may be time consuming. Due to the high reliability and strict time constraints associated with various systems, such as vehicle safety systems, autonomous vehicle systems, or other safety-critical systems, it may be desirable to reliably authenticate data of the system while reducing the overall timing of the system's boot sequence, among other operations.

The techniques described herein may reliably authenticate data associated with a memory device, while reducing the memory device's overall operation time, such as boot time or when the memory device exits a low power state (e.g., when the memory device exits a suspend-to-RAM mode). As described herein, a system may include a host device coupled with a memory device. The system, which may be an example of an automotive system, may authenticate data before an operation associated with the data is executed. To authenticate the data, the system may generate and/or assign a hash (e.g., a cryptographic hash, a first hash, a keyed hash) to each row (e.g., each row of data). Before one or more operations associated with the data is executed, the host device may transmit a request to the memory device for the data and/or the first hash. The data and the first hash may be stored to a temporary storage (e.g., a cache) of the host device in response to the request. Unless explicitly noted otherwise, as used herein a "hash" includes a hash that can be used for authentication (as opposed to a hash that can be used solely to check integrity), and an example of the "hash" may also be a "keyed hash," a MAC, or an HMAC, as referred to elsewhere herein.

Once the data and first hash are stored to the temporary storage (e.g., the cache), the host device may generate an additional hash of the data (e.g., a second hash, a second keyed hash) using a key and/or a secure message authentication code (MAC) algorithm such as hash-based message authentication code (HMAC). Although the key may be a same type of key as was used to generate the first hash, the key used to generate the second hash may be accessible to only the host device (and inaccessible to the one or more memory devices). Thus if the data is unaltered, the first hash would match the second hash generated. Accordingly, to authenticate the data, the host device may compare the first hash and the second hash and determine if the hashes match. As described herein, if the hashes match, the data may be authenticated. If the hashes do not match, the host device may be configured to perform one or more additional steps or operations to authenticate the data or to ensure that the memory device is safe and secure. In some examples, upon authenticating the data, the data, which may be associated with one or more operations, may be executed directly from the cache (e.g., as opposed to being executed from the memory device), which may minimize a quantity of communications between the host device and the memory device and thus may improve overall timing of the system. Moreover, by authenticating data before executing an associated operation, data may be authenticated on-the-fly, thus reducing the overall boot time of the associated system.

Features of the disclosure are initially described in the context of systems and dies as described with reference to FIGS. 1 and 2. Features of the disclosure are described in the context of a process flow diagram as described with reference to FIG. 3. These and other features of the disclosure are further illustrated by and described with reference to an apparatus diagram and flowcharts that relate to safety and security for memory as described with reference to FIGS. 4-7.

FIG. 1 illustrates an example of a system 100 that supports safety and security for memory in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

The host device 105 may also include a local memory (not shown). In some cases, the local memory may include read-only memory (ROM) or other memory that may store operating code (e.g., executable instructions) executable by the external memory controller 120 to perform functions ascribed herein to the external memory controller 120. In some cases, the local memory may additionally or alternatively include static random access memory (SRAM) or other memory that may be used by the external memory controller 120 for internal storage or calculations, for example, related to the functions ascribed herein to the external memory controller 120. Additionally or alternatively, the local memory may serve as a cache for the external memory controller 120. For example, the local memory may be configured to store data and hashes (e.g., cryptographic hashes) received from the memory device 110 and may be configured to authenticate the data using the methods described herein. In some examples, if the data is authenticated, the data may be executed from the local memory. In other examples, data may be stored to the local memory when read from or written to a memory device 130 or memory device 140, and may be available within the local memory for subsequent retrieval for or manipulation (e.g., updating) by the host system 105 (e.g., with reduced latency relative to a memory device 130 or memory device 140) in accordance with a cache policy.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The external memory controller 120 may be an example of a microcontroller as described herein. Additionally or alternatively, the host device 105 may include other components configured to authenticate data received from the memory device 110. For example, the host device 105 may include a hashing component (not shown) for generating one or more hashes of data using a key that is accessible by the host device 105. The host device 105 may also include a safety component (not shown) for performing one or more operations based on data being authenticated (or not authenticated). The operations of the hashing component and the safety component may be performed by each respective component or, in other examples, may be performed by the external memory controller 120.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The memory device 110 may include memory dies 160 that include different types of memory cells. For example, the memory array 170-a of the memory die 160-a may include one or more volatile memory cells. The memory array 170-a may include one or more volatile memory cells, such as dynamic random-access memory (DRAM) cells, synchronous dynamic random-access memory (SDRAM) cells, double data rate synchronous DRAM (DDR SDRAM) cells, graphics DDR SDRAM (GDDR SDRAM), and/or static random-access memory (SRAM). The volatile memory cells of the memory array 170-a may be configured to receive data from other memory arrays (e.g., memory arrays of other memory die) of the memory device 110.

The memory device 110 may include one or more arrays of non-volatile memory cells. For example, the memory array 170-b of the memory die 160-b may include one or more non-volatile memory cells. The memory array 170-b may include one or more non-volatile memory cells such as NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). The non-volatile memory cells of the memory array 170-b may be configured to communicate data to the volatile memory of the memory array 170-a via one or more signal paths (not shown).

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

The memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105. The memory device 110 may receive a request for data (e.g., a read command) and the data may be authenticated (or not authenticated) by the host device. The memory device 110 may receive other notifications, commands, or requests from the host device 105 that relate to the authentication of data as described herein.

A local memory controller 165 (e.g., local to a memory die 160) may include circuits, logic, or components operable to control operation of the memory die 160. A local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The system 100 may be an example of a system 100 used in an automotive application. For example, the host device 105 and the memory device 110 (e.g., the different memory die 160 of the memory device 110) may control different applications and operations of a vehicle. Because vehicles are often powered on and off, the memory device 110 may include volatile memory to process data and non-volatile memory to store the data when the system 100 is powered off or in a reduced power state. Moreover, vehicles may be subject to strict timing constraints and thus it may be desirable to decrease the time it takes to perform certain operations. For example, by authenticating data of the memory device before executing an operation associated with the data (e.g., as opposed to authenticating all data upon booting the system 100), the overall boot time of the system 100 (e.g., the time needed to start a vehicle) may be reduced.

To authenticate data associated with the memory device 110, data and a corresponding hash may be communicated (e.g., transferred) from non-volatile memory of the memory array 170-b to volatile memory of the memory array 170-a. The hash, which may be referred to as a first hash, may be used by the host device 105 to authenticate the data. The data and hash may be transferred to the volatile memory of the memory array 170-a in different scenarios. For example, in one scenario the data may be transferred when the system 100 is booted (e.g., powered on). Once stored in the volatile memory of the memory array 170-a, the host device 105 may transmit a request to the memory device 110 for the data and/or the hash, and the data and the hash may be communicated to the host device via one or more channels 115.

At the host device 105, the data and corresponding hash may be stored, for example, to a local memory. As described herein, the external memory controller 120 may include local memory configured as cache storage. Once stored to the cache, the external memory controller 120 (or other component such as a hashing component (not shown)) may generate a second hash of the data. The second hash may be generated using a key and/or a secure MAC algorithm such as HMAC that is accessible only by the host device 105 (and thus inaccessible by the memory device 110). If the second hash matches the first hash, the data may be authenticated and thus may be executed (e.g., an operation associated with the data may be executed) directly from the cache. By authenticating data before executing an operation associated with the data at the host device without necessarily authenticating the data at one or more of the memory dies 160, the timing associated with booting the system 100 or the timing when exiting a low power state, such as a suspend-to-RAM mode, may be reduced.

In other examples, if the second hash does not match the first hash, the data may not be authenticated. To maximize safety and security of the system 100, unauthenticated data may not be executed and the host device 105 may perform one or more additional steps and/or operations to authenticate the data or to operate the memory device 110 in a safe manner, such as requesting the data an additional time. Accordingly, in addition to reducing the timing associated with booting the system 100, the methods for authenticating data as described herein may allow for an automotive system (e.g., such as system 100) to operate safely and securely.

Figure 2:
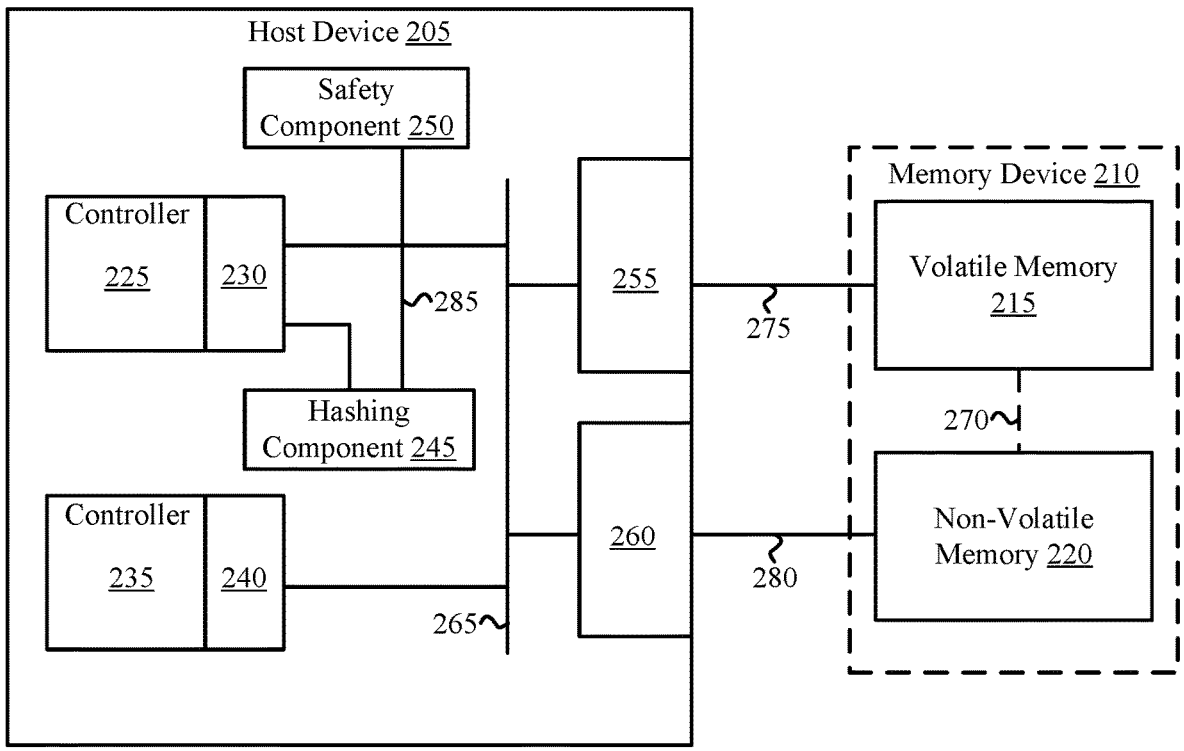
FIG. 2 illustrates an example of a system that supports safety and security for memory in accordance with examples as disclosed herein.

FIG. 2 illustrates an example of a system 200 that supports safety and security for memory in accordance with examples as disclosed herein. The system 200 may include a host device 205 and a memory device 210. The host device 205 may be an example of a host device 105 and the memory device 210 may be an example of a memory device 110 as described with reference to FIG. 1. The memory device 210 may include volatile memory 215 and/or non-volatile memory 220, and the host device 205 may communicate with the volatile memory 215 and the non-volatile memory 220 via signal path 275 and signal path 280, respectively. In some examples, each of the volatile memory 215 or the non-volatile memory 220 may be included in different memory devices 110. The host device 205 may authenticate data associated with the memory device 210 in a more efficient and effective way, which may reduce the overall boot time or the timing associated with exiting a low power state, such as a suspend-to-RAM mode, of the memory system 200.

The host device 205 may include components configured to authenticate data associated with the memory device 210. The data associated with the memory device 210 may include, for example, program code or other types of data. In some examples, the host device 205 may include a controller 225 (e.g., a microcontroller 225) configured to communicate with the volatile memory 215 and/or the non-volatile memory 220 of the memory device. The controller 225 may include (or may be coupled with or configured at least part as) a cache 230 (e.g., cache storage 230) that is configured to store data associated with the volatile memory 215 during an authentication operation, among other things. In some examples, the cache 230 may also store one or more hashes (e.g., cryptographic hashes) associated with the data. The host device 205 may also include a controller 235 (e.g., a microcontroller 235) that may include a cache 240 (e.g., cache storage 240). The cache 240 may be configured to store data associated with the non-volatile memory 220.

The host device 205 may include a hashing component 245 and a safety component 250. The hashing component 245 may be referred to as a first circuit and may be configured to generate one or more hashes (e.g., cryptographic hashes, keyed hashes) during one or more operations, such as an authentication operation. The hashing component 245 may have access to (e.g., have stored or written) a key (e.g., a secret key, a key accessible to only the host device 205, a key inaccessible to one or more memory devices 210) and/or a secure MAC algorithm such as HMAC that may be used to generate the hash or hashes. The hashing component 245 may include storage configured to store the key or, in other examples, may assign (e.g., store) the key to the cache 230 or receive the key from one or more memory devices 210.

As described herein, the memory device 210 may include volatile memory 215 and non-volatile memory 220. The volatile memory 215 may include one or more memory cells, such as dynamic random-access memory (DRAM) cells. The non-volatile memory 220 may include one or more memory cells, such as flash (e.g., NAND) memory cells and/or FeRAM memory cells. In some examples, the volatile memory 215 may communicate with the non-volatile memory 220 via signal path 270.

Although FIG. 2 illustrates the volatile memory 215 and the non-volatile memory 220 as being part of a same memory device (e.g., memory device 210), the volatile memory 215 and the non-volatile memory 220 may be included as part separate memory devices (e.g., separate memory devices 210) or may otherwise be separate from each other. For example, the volatile memory 215 may be included in a first memory device 210 (not shown) and the non-volatile memory 220 may be included in a second memory device 210 (e.g., a different memory device, not shown). The first and second memory devices may communicate via a signal path, such as signal path 270.

When the system 200 is off (e.g., powered down), data may be stored to the non-volatile memory 220. When the system 200 is powered on (e.g., when the system is booted), the data may be communicated (e.g., transferred) from the non-volatile memory 220 to the volatile memory 215. In some examples, the data may be communicated via the signal path 270. In other examples, the data may be communicated from the non-volatile memory 220 to the volatile memory 215 via the host device 205. For example, the data may be communicated via signal path 280 and may be received by a controller 260 (e.g., a non-volatile memory controller 260). The data may be communicated via a bus 265 to a controller 255 (e.g., a volatile memory controller 255) and to the volatile memory 215 via the signal path 275. Once the data is stored to the volatile memory 215 and/or in the host device 205, it may be authenticated by the host device 205 before an associated operation is executed. Authenticating the data before executing an associated operation may allow for the memory system 200 to selectively authenticate data, as opposed to authenticating all data of the volatile memory 215 in a single operation (e.g., when booting the system or when exiting a low-power mode). By selectively authenticating data—before executing an associated operation—the overall boot time of the system 200 and the timing when exiting a low-power mode, such as a suspend-to-RAM mode, may be reduced.

In other examples, the data may be communicated from the memory device 210 to the host device 205 when the memory device 210 comes out of a low power mode (e.g., a suspend mode, a suspend-to-RAM mode). In some examples, the memory device 210 may enter a suspend-to-RAM mode. During a suspend-to-RAM mode, the memory device 210 may operate in a lower-power state, and information on system configuration, open applications, and active files may be stored in the volatile memory 215 while other components of the memory system 200 are powered off. In some examples, when the memory device 210 exits the suspend-to-RAM mode (e.g., when the memory device changes its operational modes), some or all of the data stored at the volatile memory 215 while the memory device was in the low-power state may be authenticated. When the data is authenticated, it may be communicated directly from the volatile memory 215 of the memory device 210 to be authenticated. That is, the data may already be stored to the volatile memory and thus may not need to be communicated from the non-volatile memory 220 to the volatile memory 215 before being authenticated.

To authenticate data associated with the memory device 210, the data communicated to the volatile memory 215 may be associated with a respective hash (e.g., a respective cryptographic hash, a respective keyed hash, a MAC such as an HMAC). The hash may be generated using a cryptographic hash function, such as SHA-256. In some examples, the hash associated with the data may be a complete hash (e.g., a complete version of the cryptographic hash) or may be a truncated version of the hash (e.g., a version of the hash that is shorter than a length of a full hash). To generate a truncated hash, a complete hash may be generated. The complete hash may be a first length (e.g., 64 or 256 bits). The complete hash may then be truncated to a length that is shorter than the first length. For example, a truncated hash may include 6 or 8 bits of a 64 bit full hash, or may include 64 (or fewer) bits of a 256 bit full hash, among other examples.

For example, a truncated version of the hash may include a portion (e.g., a subset) of a complete hash (e.g., 64 or fewer bytes of the complete hash). The data may be authenticated, as described herein, using either the complete hash or a truncated version of the hash. Additionally or alternatively, the hash may be generated and assigned to the data when the system 200 is booted (e.g., before the data is communicated to the volatile memory 215). In other examples, the data and respective hashes may be stored to the non-volatile memory 220 and may be communicated to the volatile memory 215 when the system 200 is booted.

The host device 205 may utilize a hash-based message authentication code (HMAC) to authenticate the data associated with the memory device 210. To authenticate the data using a HMAC, the data and associated hash (e.g., a keyed hash) may be communicated from the volatile memory 215 to the host device 205. The host device 205 may transmit a request to the volatile memory 215 for the data, and the data and the hash may be communicated to the host device 205. In some examples, the hash communicated from the volatile memory 215 to the host device and/or the hash generated by the hashing component 245 may be or may be referred to as a keyed hash. By communicating and/or generating keyed hashes, the integrity of the associated data may be verified in addition to the data being authenticated. Additionally or alternatively, the hash may be generated using a MAC algorithm such as a HMAC, which may further ensure the integrity and/or the authenticity of the data.

The data may be received by the controller 225 and, in some examples, the data and associated hash may be written to the cache 230 (e.g., to one or more lines of the cache 230) by the controller 225. For example, the data and hash may be written to the cache 230 as 32 bytes of data or 64 bytes of data (e.g., 32 or 64 bytes of program code) and 8 bytes of a hash. The cache 230 may include multiple portions (e.g., a set of lines) configured to store data and associated hashes. In some examples, each cache line of the set of cache lines may be assigned data and an associated hash to be authenticated. As described herein, upon being authenticated, the data may be executed directly from the cache line.

Before executing an operation associated with the data, the hashing component 245 may generate a hash (e.g., a second hash) of the data using a key and/or a secure MAC algorithm such as HMAC inaccessible to the memory device 210. In some examples, a size of the generated hash may correspond to a size of the hash stored to the cache 230 while in other examples a size of the generated hash may be different than a size of the hash stored to the cache 230. For example, if the hash stored to the cache 230 is a truncated hash (e.g., 6 or 8 bytes) then the hashing component 245 may generate a truncated hash. In other examples, if the hash stored to the cache 230 is a complete hash (e.g., a full hash), then the hashing component 245 may generate a complete hash. The generated hash may be compared with the hash received from the volatile memory 215 and stored to the cache 230. If the hashes match, the data may be executed from the cache 230 (e.g., from the line of the cache 230). If the hashes do not match, the data may have been altered (e.g., by a malicious attacker) and the safety component 250 may initiate one or more operations as described herein.

In some examples, the hashing component 245 may authenticate the data by generating a hash of the data using a key inaccessible to the one or more memory device 210. For example, the key and/or the secure MAC algorithm such as HMAC, which may be referred to as a secret key or a private key, may be inaccessible to both the volatile memory 215 and the non-volatile memory 220. In some examples, the secret key may be accessible only to the host device 205 (e.g., to the hashing component 245 of the host device 205). In some examples, the key may be selected by the hashing component 245 based on one or more characteristics of the data to be authenticated. In other examples, the key may be specific to the hashing component 245 (e.g., the key may be the only key used by the hashing component) and may be identical to the key that was used to hash the data stored to the non-volatile memory 220 and/or the volatile memory 215. The key may be stored to the hashing component 245 or, in some examples, may be stored to a different portion of the host device 205 (e.g., stored to an embedded trusted platform module (TPM) of the host device 205).

One or more operations associated with different data (e.g., second data) may be executed before or concurrent with the data transmitted from the memory device 210 to the host device 205 being authenticated. For example, the controller 225 may execute operations associated with data stored to the volatile memory 215 while the hashing component 245 is authenticating data stored to the cache 230.

In other examples, the controller 225 may execute a quantity of operations on data (e.g., second data) stored to the volatile memory 215 before the hashing component 245 authenticates data (e.g., first data) stored to the cache 230. Executing operations on second data stored to the volatile memory 215, which may be referred to as pipelining, may allow for the second data to be executed before other data is authenticated. In some examples, first data may be authenticated based on the occurrence of one or more triggers. For example, first data may be authenticated upon a threshold quantity of operations being executed by the controller 225, after first data has been stored to the cache 230 for a threshold time, or other instances.

In some examples, the host device 205 may authenticate data associated with the memory device 210 using a message authentication code (MAC). To authenticate the data using a MAC, the data and hash may be communicated to the host device 205 along with a tag (e.g., a key). The tag may be used to authenticate that the message was received from the intended sender (e.g., from the memory device 210). Accordingly, the host device 205 may verify the tag and, upon verifying the tag, may attempt to authenticate the data. To authenticate the data, the data and associated hash may be written to the cache 230 (e.g., to a line of the cache 230) by the controller 225. Before executing an operation associated with the data, the hashing component 245 may generate a hash of the data using a secret key or a private key, and the generated hash may be compared with the hash received from the volatile memory 215. If the hashes match, the data may be executed from the cache 230 (e.g., from the line of the cache 230).

Based on authenticating the data (or not authenticating the data—a failure in authenticating the data), the hashing component 245 may communicate with the safety component 250 via the signal path 285. The safety component 250, which may be referred to as a second circuit, may be configured to receive information (e.g., from the controller 225 and/or the hashing component 245) pertaining to whether data is authenticated. For example, when data is not authenticated the safety component 250 may discard the data, may initiate a request for the data to be retransmitted from the memory device 210 for authentication, and/or may update an operational mode of the memory device 210.

The hashing component 245 may communicate a notification to the safety component 250 that indicates whether the data was authenticated. If the data was authenticated, the safety component 250 may generate a notification to be transmitted to the memory device 210 indicating that the data was authenticated. If, however, the data was not authenticated, the safety component 250 may perform one or more operations to attempt to authenticate the data or to protect the memory device 210 from a malicious attack (e.g., due to the data not being authenticated). For example, the safety component 250 may instruct the controller 225 to refrain from executing the data and may initiate a backup operation of the data stored to the memory device 210 or may initiate a request for the data from one or more other components (e.g., volatile memory 215, non-volatile memory 220). In some examples, the safety component may instruct the controller to perform such operations by transmitting an indication to the controller. The indication may include or may refer to one or more bits that indicate a specific operation to perform (e.g., to perform a backup operation of the data stored to the memory device 210).

If the safety component 250 receives a notification that data was not authenticated, the host device 205 may attempt to authenticate the data a second time (e.g., may reattempt to authenticate the data). For example, the safety component 250 may generate a request for the data and hash to be communicated (e.g., recommunicated) from the volatile memory 215 to the host device 205. The request may be transmitted to the memory device 210 from the safety component 250 or from another component, such as the controller 225. In addition to generating a request, the safety component 250 may be configured to discard the data (and hash) stored to the cache 230 that were not authenticated. Upon receiving the data and the hash recommunicated from the volatile memory 215, the hashing component 245 may attempt to authenticate the data for a second time using the authentication procedures described herein. If the data is not authenticated for a second time, the safety component 250 may continue to generate requests for the data and hash to be communicated (e.g., recommunicated) from the volatile memory 215 to the host device 205. In some examples, the data and hash may be recommunicated until the data is authenticated.

In some examples, the safety component 250 may be configured to change an operational mode of the memory device 210, among other examples, based on the data not being authenticated. Because non-authenticated data may indicate a malicious attack on the memory device 210, it may be desirable for the memory device 210 to operate in a safe state. A safe state, as used herein, may refer to the memory device 210 having reduced functionality. For example, the memory device 210 may operate in a read-only mode when in a safe state. To change an operational mode of the memory device 210, the safety component 250 may generate a command, which may be transmitted to the memory device 210 from the safety component 250 or from another component, such as the controller 225. In some examples, to change an operational mode of the memory device 210, the safety component 250 may send an indication to another components, such as controller 225, to facilitate generating a command, which may be transmitted to the memory device 210 from the host device 205.

Upon authenticating data received form the memory device 210, the controller 225 or hashing component 245 may execute the data stored to the cache 230. By executing the data from the cache 230 after authenticating the data using a MAC or an HMAC, among other examples, for example before otherwise authenticating the data at the volatile memory 215 and/or the non-volatile memory 220, the quantity of communications between the host device 205 and the memory device 210 may be reduced and the time and the operations needed to authenticate the data can be streamlined. Additionally, by authenticating the data before it is executed as opposed to authenticating the data each time the system 200 is booted the overall boot time of the system 200 may be reduced.

Figure 3:
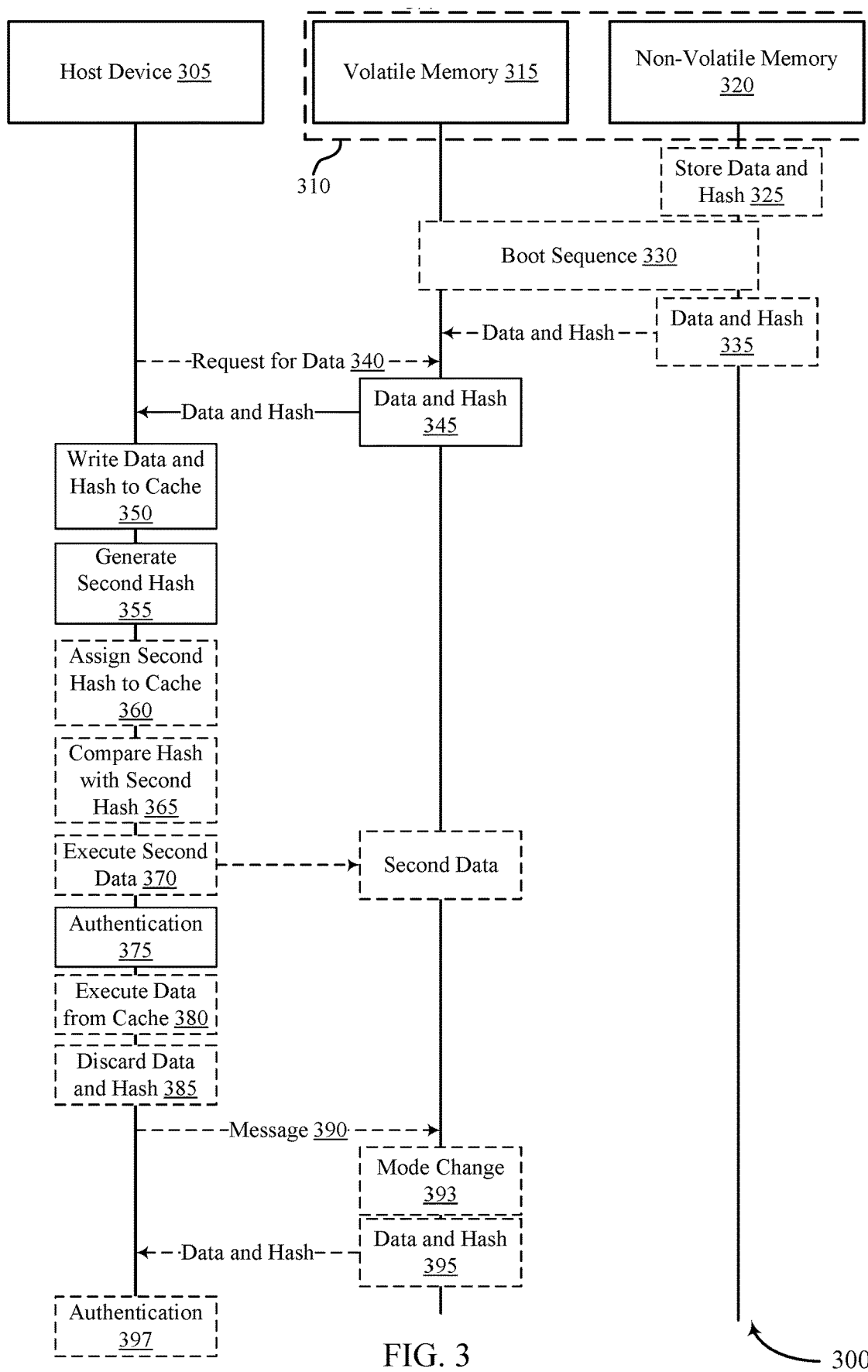
FIG. 3 illustrates an example of a process flow diagram that supports safety and security for memory in accordance with examples as disclosed herein.

FIG. 3 illustrates an example of a process flow diagram 300 that supports safety and security for memory in accordance with examples as disclosed herein. The process flow diagram 300 may illustrate operations performed at or by a host device 305, volatile memory 315, and non-volatile memory 320. The volatile memory 315 and the non-volatile memory 320 may be included in a single memory device 310 or may each be included in separate memory devices 310 that may be coupled with one another. The host device, memory device 310, volatile memory 315, and non-volatile memory 320 may be examples of a host device 205, a memory device 210, volatile memory 215, and non-volatile memory 220 as described with reference to FIG. 2. The host device 305 may be configured to authenticate data associated with the memory device 310 before executing an operation associated with the data, which may reduce the overall boot time of an associated memory system.

The process flow diagram 300 may illustrate data being authenticated by a host device 305 before one or more operations (e.g., a threshold quantity of operations) associated with the data is executed. As described with reference to FIG. 2, the data to be authenticated may include, for example, program code or other types of data. Additionally or alternatively, the memory device 310 may include volatile memory 315 and non-volatile memory 320. The volatile memory 315 may include one or more memory cells, such as DRAM cells and the non-volatile memory 320 may include one or more memory cells, such as FeRAM memory cells or flash (e.g., NAND) memory cells. The volatile memory 315 and non-volatile memory may be located within a memory device, such as memory device 310 or may be separate memory devices. In either instance, data stored to the volatile memory 315 may be communicated to the host device 305 for authentication before an associated operation is executed.

At 325, data and associated hashes (e.g., cryptographic hashes) may optionally be stored to the non-volatile memory 320. As described with reference to FIG. 2, the associated hashes may be complete hashes or may be truncated (e.g., truncated relative to the complete hash). The data and associated hashes may be stored to the non-volatile memory in the event that the associated system is powered off. When the system is powered on (e.g., booted), the data may be communicated to the volatile memory 315 and/or the host device 305 to be authenticated.

At 330, the volatile memory 315 and the non-volatile memory 320 may optionally be booted (e.g., powered on). In an automotive context, for example, the boot sequence may represent a vehicle starting. In some examples, data stored to the memory device 310 may be authenticated after at least part of the boot sequence and before an associated operation is executed. By authenticating data after the boot sequence, the time needed to boot the associated system (e.g., the memory device 310) may be reduced, but by using a cryptographic representation of a MAC the data may otherwise be correctly authenticated. In some examples, a cryptographic representation of a MAC may refer to a hash (e.g., a cryptographic hash) of a message authentication code (MAC). The MAC may be hashed, using a hashing algorithm such as SHA-256. In some examples, the data may be authenticated using a cryptographic representation of a HMAC. In either example, the hash may be a full hash (e.g., a complete hash) or may be a truncated hash that includes a subset of the full hash. For example, a truncated hash may include a subset of bits of the complete hash, such as 8 bits.

At 335, the data and respective hashes stored to the non-volatile memory 320 may be optionally communicated to the volatile memory 315. In instances where the memory device 310 is already powered (e.g., when coming out of a low power mode), the data and associated hashes may not be communicated from the non-volatile memory 320 to the volatile memory 315. However, due to operational characteristics of the volatile memory 315, the data and associated hashes may be communicated from the non-volatile memory 320 to the volatile memory 315, for example, upon booting the associated system (e.g., the memory device 310). The data and associated hashes may be communicated from the non-volatile memory 320 to the volatile memory 315 directly (e.g., as shown in FIG. 3) or by way of the host device 305 (not shown).

At 340, the host device 305 may optionally transmit a request for data to the volatile memory 315. The request may be for a subset of the data stored to the volatile memory 315, which may be referred to as first data. The first data may be associated with a hash (e.g., a first hash) to be used for authenticating the data.

At 345, the first data and first hash may be communicated from the volatile memory 315 to the host device 305. The data may be received at, for example, a controller of the host device 305 (e.g., a controller 225 as described with reference to FIG. 2).

At 350, the host device 305 may write (e.g., store) the first data and the first hash to a cache. For example, the host device may write the first data and the first hash to a line in the cache. As described with reference to FIG. 2, the cache may be a portion of a controller (e.g., a storage portion that may be configured as a cache) that is configured as temporary storage. When the first data and first hash are written to the cache, a component of the host device 305 may attempt to authenticate the first data before the first data is executed.

At 355, the host device 305 (e.g., a hashing component 245 as described with reference to FIG. 2) may generate a second hash of the first data using a secret key or a private key. The secret key or the private key may be known and/or accessible only to the host device 305, and may not be known to the volatile memory 315 or the non-volatile memory 320. The secret key or the private key may correspond to a key and/or a secure MAC algorithm such as HMAC used to hash the first data (e.g., a key used to generate the first hash), but may be private in order to reliably authenticate the first data.

At 360, the host device 305 (e.g., a hashing component 245 as described with reference to FIG. 2) may optionally assign (e.g., store) the second hash to the cache. The second hash may be assigned to the same line in the cache as the first data and the first hash. At 365, the host device 305 (e.g., a hashing component 245 as described with reference to FIG. 2) may compare the first hash with the second hash. Based on the comparison, the host device 305 may determine whether the first hash matches the second hash.

At 370, the host device 305 may optionally execute one or more operations associated with additional data (e.g., second data) before authenticating the first data. The term second data may refer to any data stored to the volatile memory 315 other than the first data. The host device 305 may execute such operations before or concurrent with authenticating the first data. The host device 305 may include a counter that may be incremented each time second data is executed. When the counter satisfies a threshold value (e.g., when a threshold quantity of operations associated with the second data are executed), the first data may be authenticated.

At 375, the host device 305 (e.g., a hashing component 245 as described with reference to FIG. 2) may authenticate the first data. The authentication may be based on a comparison of the first hash and the second hash. For example, if the first hash matches the second hash, the first data may be authenticated and may ultimately be executed. However, if the first hash does not match the second hash, the first data may have been modified and thus may not be authenticated by the host device 305.

At 380, if the first data is authenticated (e.g., at 375) then an operation associated with the first data may be executed. The first data may be executed from the cache line where it was previously stored (e.g., at 350). By executing the data from the cache line, the host device 305 need not communicate with the volatile memory 315 to execute the data, thus reducing the overall time to execute the first data.

At 385, if the first data is not authenticated (e.g., at 375) then the host device 305 (e.g., a safety component 250 as described with reference to FIG. 2) may optionally discard the first data. That is, when the first data is not authenticated the first data may have been altered or modified. Because it is undesirable to execute modified data, the host device 305 may discard the first data and attempt to authenticate (e.g., reauthenticate) first data stored to the volatile memory 315.

At 390, the host device 305 (e.g., a safety component 250 as described with reference to FIG. 2) may optionally generate a message (e.g., a notification, an instruction, a request, etc.) to be communicated to the volatile memory 315. The message may indicate that the first data was authenticated (e.g., at 375) and/or executed (e.g., at 380) or that the first data was not authenticated (e.g., at 375). If the data was not authenticated, the message may request that the first data to be re-transmitted from the volatile memory 315 to the host device 305 for authentication. Additionally or alternatively, if the data was not authenticated, the message may instruct the volatile memory 315 to operate in a safe state (e.g., a safe mode), such as a read-only mode until the first data is authenticated.

At 393, the volatile memory 315 may optionally change modes based on the message (e.g., transmitted at 390). In some examples (not shown), the memory device 310 may change modes. The volatile memory 315 may change modes to a safe state (e.g., a safe mode) until the first data is authenticated or until another condition is met. As described herein, the safe state may include a read-only mode.

At 395, the volatile memory 315 may optionally transmit (e.g., retransmit) the first data and the first hash based on the message (e.g., transmitted at 390). The first data and the first hash may be retransmitted based on the first data not being authenticated (e.g., at 375). Although not shown in FIG. 3, the first data and the first hash may be written to a cache, a second hash may be generated, the second hash may be assigned (e.g., reassigned) to the cache, and/or the second hash may be compared with the first hash before the first data is executed.

At 397, the host device 305 (e.g., a hashing component 245 as described with reference to FIG. 2) may optionally attempt to authenticate the retransmitted first data. The authentication operation may be a same operation as at 375, and may continue to occur until the first data is authenticated. In the event that subsequent authentication operations are performed on the first data, the operations at steps 380, 385, 390, 393, and 395 may optionally occur between each authentication operation. Once the first data is authenticated, an associated operation may be executed. Thus by authenticating the data before it is executed—as opposed to authenticating the data each time the memory device 310 is booted—the overall boot time of the associated system may be reduced.

Figure 4:
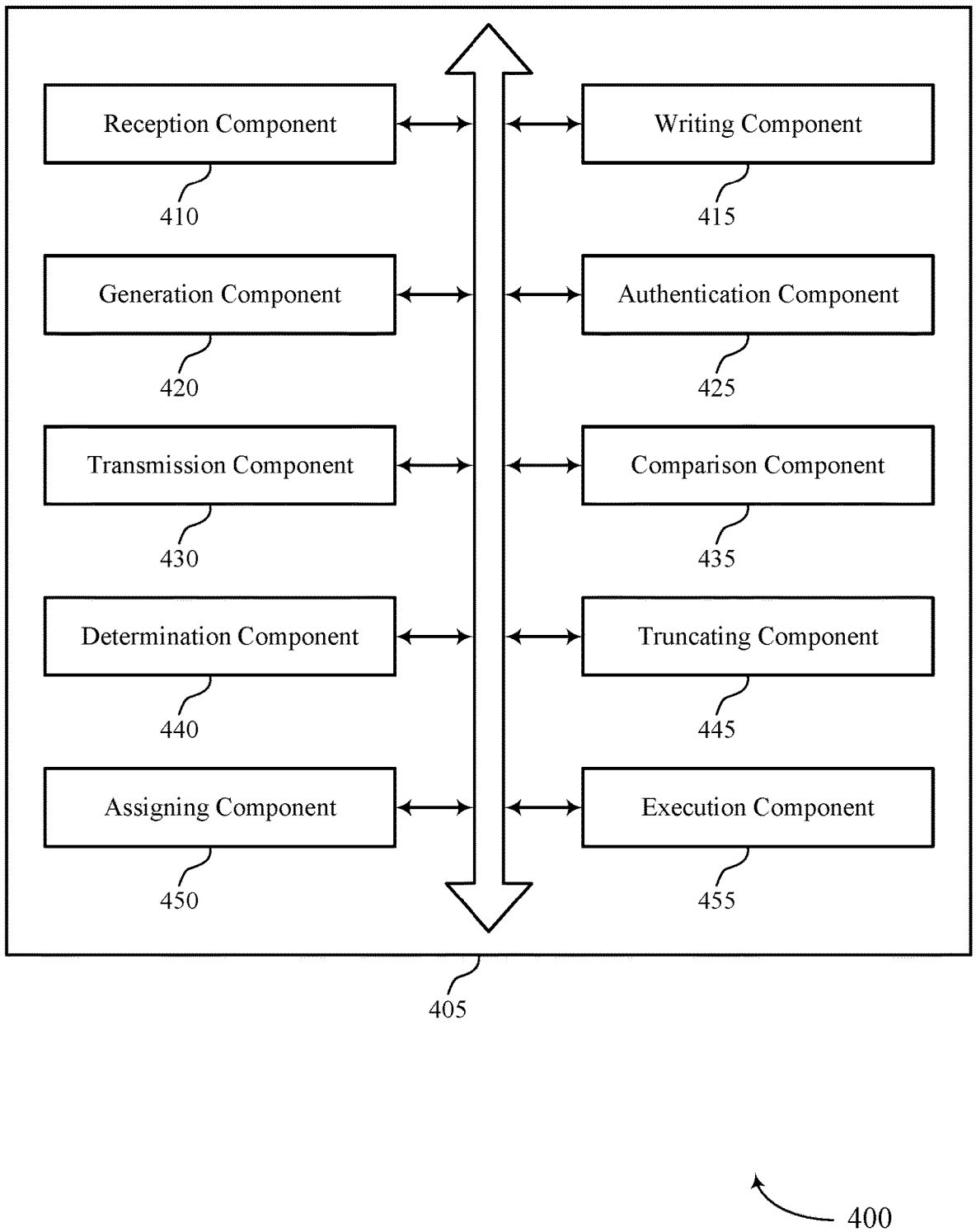
FIG. 4 shows a block diagram of a host device that supports safety and security for memory in accordance with aspects of the present disclosure.

FIG. 4 shows a block diagram 400 of a host device 405 that supports safety and security for memory in accordance with examples as disclosed herein. The host device 405 may be an example of aspects of a host device as described with reference to FIGS. 2 and 3. The host device 405 may include a reception component 410, a writing component 415, a generation component 420, an authentication component 425, a transmission component 430, a comparison component 435, a determination component 440, a truncating component 445, an assigning component 450, and an execution component 455. Each of these modules may communicate, directly or indirectly, with one another (e.g., via one or more buses).

The reception component 410 may receive, by a host device from a volatile memory, data and a first hash associated with the data.

The writing component 415 may write, by the host device, the data and the first hash to a cache of the host device.

The generation component 420 may generate, by the host device, a second hash associated with the data using a key that is accessible to the host device and inaccessible to the volatile memory, the second hash including a cryptographic construction of a message authentication code. The generation component 420 may generate a third hash using the data and the key that is accessible to the host device and inaccessible to the volatile memory. In some cases, the second hash associated with the data is generated after the data and the first hash are written to the cache of the host device.

The authentication component 425 may authenticate, by the host device and before executing an operation associated with the data, the data from using the first hash received from the volatile memory and the second hash generated by the host device.

The transmission component 430 may transmit, by the host device to the volatile memory, a request for the data, where receiving the data and the first hash associated with the data is based on transmitting the request. The transmission component 430 may transmit an indication to a circuit of the host device to back up the data based on refraining from executing the one or more operations associated with the data.

The comparison component 435 may compare at least a portion of the first hash written to the cache of the host device with at least a portion of the second hash based on generating the second hash.

The determination component 440 may determine whether the portion of the first hash written to the cache of the host device matches the portion of the second hash based on the comparing. The determination component 440 may determine that the data is invalid based on determining that the portion of the first hash does not match the portion of the second hash. The determination component 440 may determine the key for generating the second hash based on a portion of the cache in which that the data and the first hash are written to, where generating the second hash is based on determining the key.

The truncating component 445 may truncate the third hash to generate the second hash. In some cases, the cryptographic construction of the message authentication code includes a hash-based message authentication code (HMAC). In some cases, the first hash includes a key.

The assigning component 450 may assign the second hash to a line in the cache of the host device, where the data is authenticated based on assigning the second hash to the line in the cache of the host device.

The execution component 455 may execute, by the host device, at least one operation associated with the data before authenticating the data using the first hash and the second hash. The execution component 455 may execute, by the host device, a quantity of operations associated with second data concurrent with authenticating the data using the first hash and the second hash, where authenticating, by the host device, the data using the first hash and the second hash is based on executing the at least one operation associated with the data, or executing the quantity of operations associated with second data, or both.

Figure 5:
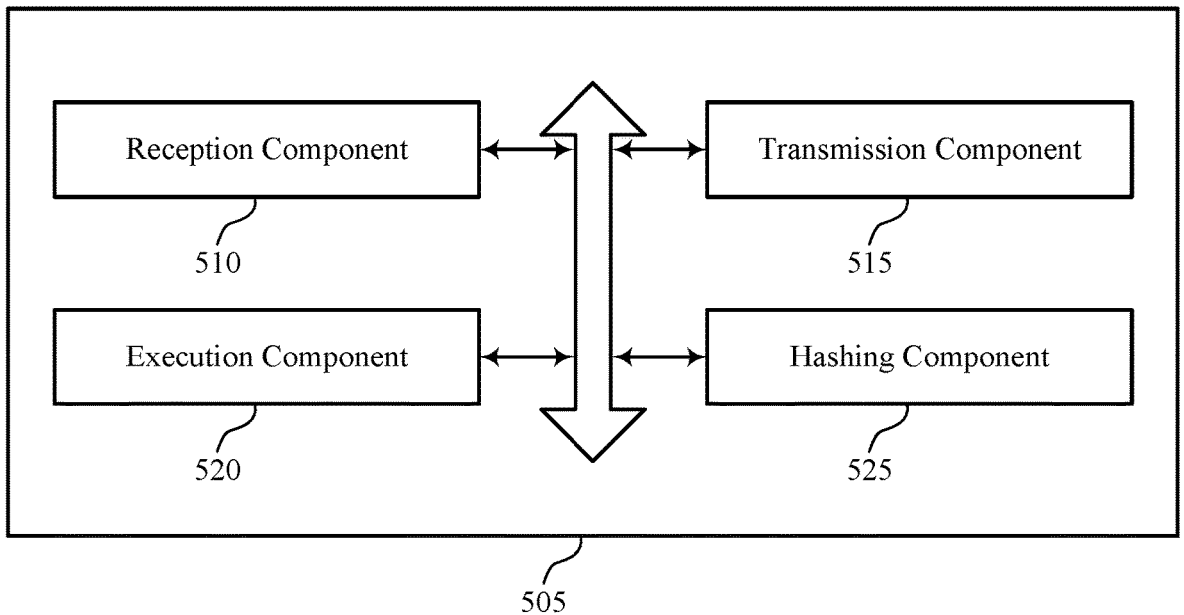
FIG. 5 shows a block diagram of a memory device that supports safety and security for memory in accordance with aspects of the present disclosure.

FIG. 5 shows a block diagram 500 of a memory device 505 that supports safety and security for memory in accordance with examples as disclosed herein. The memory device 505 may be an example of aspects of a memory device as described with reference to FIGS. 2 and 3. The memory device 505 may include a reception component 510, a transmission component 515, an execution component 520, and a hashing component 525. Each of these modules may communicate, directly or indirectly, with one another (e.g., via one or more buses).

The reception component 510 may receive, at a volatile memory from a non-volatile memory, data and a hash associated with the data. The reception component 510 may receive, at the volatile memory from a host device, a request for the data. In some examples, the reception component 510 may receive, from the host device, an indication that the data was authenticated based on transmitting the data and the hash to the host device.

The transmission component 515 may transmit, to the host device, the data and the hash based on receiving the request for data.

The execution component 520 may execute at least one operation associated with the data after transmitting the data and the hash to the host device and before the data is authenticated. The execution component 520 may execute at least one operation associated with second data different than the data, where a threshold quantity of operations associated with the data or the second data are executed before the data is authenticated at the volatile memory. In some examples, the execution component 520 may execute data received from a cache line of the host device before the data is authenticated by the host device.

In some cases, the hash includes a hash-based message authentication code (HMAC), and where the data and the hash are transmitted to the host device for authentication using a key that is inaccessible to the volatile memory and the non-volatile memory. In some cases, the data and the hash are stored at the non-volatile memory prior to being received at the volatile memory, where the data and the hash associated with the data are received at the volatile memory during a boot sequence associated with a memory device including the volatile memory. In some cases, the data and the hash associated with the data are transmitted to the host device based on a change in an operational mode of a memory device including the volatile memory.

In some cases, the non-volatile memory stores a full hash associated with the data, and where the hash received by the volatile memory includes the full hash. In some cases, the request for data is received before the data and the hash are received from the non-volatile memory. In some cases, the volatile memory is located in a first memory device different than a second memory device that includes the non-volatile memory. In some cases, the hash associated with the data includes a key.

Figure 6:
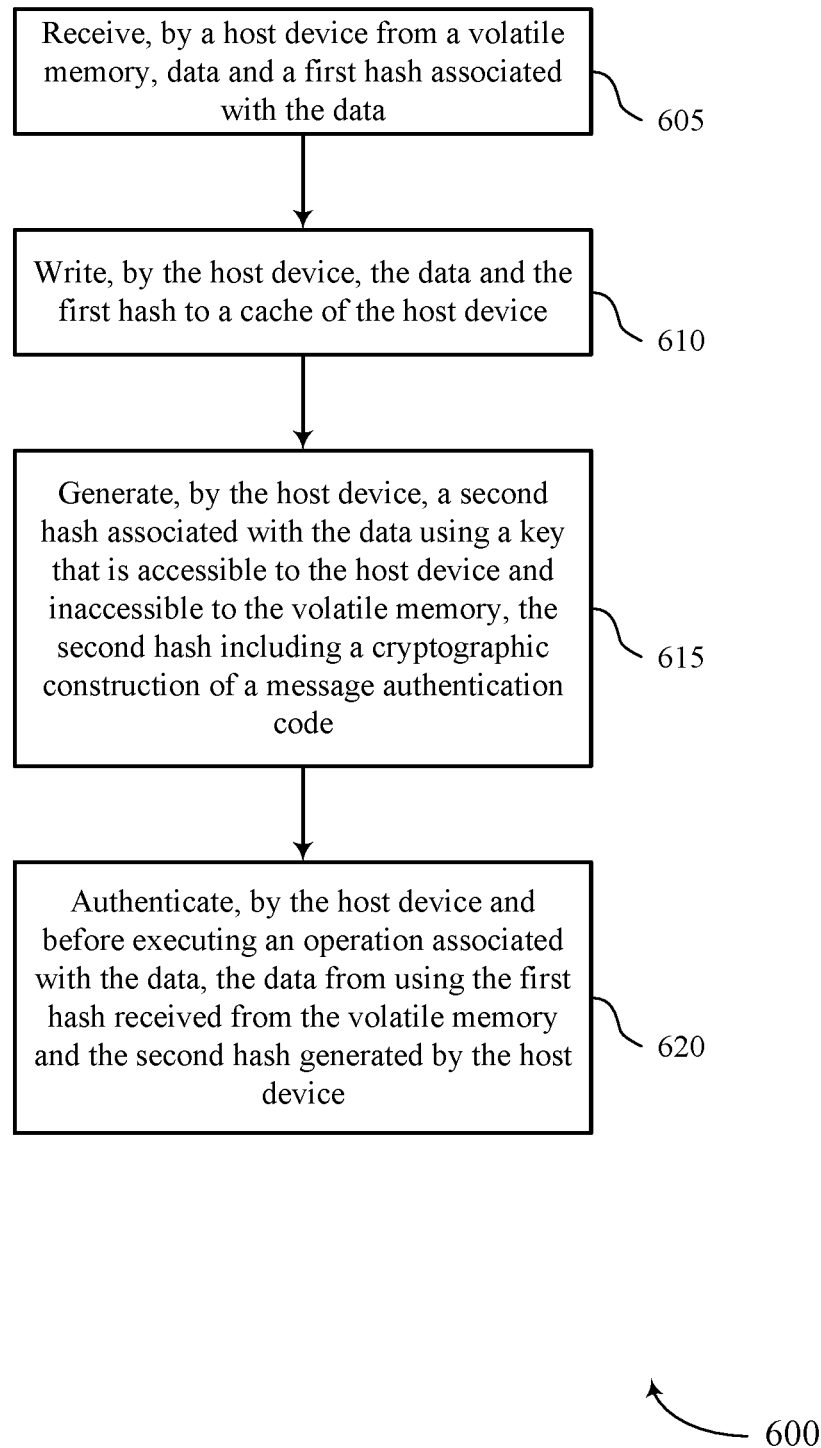
FIGS. 6 and 7 show flowcharts illustrating a method or methods that support safety and security for memory in accordance with examples as disclosed herein.

FIG. 6 shows a flowchart illustrating a method or methods 600 that supports safety and security for memory in accordance with aspects of the present disclosure. The operations of method 600 may be implemented by a host device or its components as described herein. For example, the operations of method 600 may be performed by a host device as described with reference to FIG. 4. In some examples, a host device may execute a set of instructions to control the functional elements of the host device to perform the described functions. Additionally or alternatively, a host device may perform aspects of the described functions using special-purpose hardware.

At 605, the host device may receive, from a volatile memory, data and a first hash associated with the data. The operations of 605 may be performed according to the methods described herein. In some examples, aspects of the operations of 605 may be performed by a reception component as described with reference to FIG. 4.

At 610, the host device may write the data and the first hash to a cache of the host device. The operations of 610 may be performed according to the methods described herein. In some examples, aspects of the operations of 610 may be performed by a writing component as described with reference to FIG. 4.

At 615, the host device may generate a second hash associated with the data using a key that is accessible to the host device and inaccessible to the volatile memory, the second hash including a cryptographic construction of a message authentication code. The operations of 615 may be performed according to the methods described herein. In some examples, aspects of the operations of 615 may be performed by a generation component as described with reference to FIG. 4.

At 620, the host device may authenticate, before executing an operation associated with the data, the data from using the first hash received from the volatile memory and the second hash generated by the host device. The operations of 620 may be performed according to the methods described herein. In some examples, aspects of the operations of 620 may be performed by an authentication component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving, by a host device from a volatile memory, data and a first hash associated with the data, writing, by the host device, the data and the first hash to a cache of the host device, generating, by the host device, a second hash associated with the data using a key that is accessible to the host device and inaccessible to the volatile memory, the second hash including a cryptographic construction of a message authentication code, and authenticating, by the host device and before executing an operation associated with the data, the data from using the first hash received from the volatile memory and the second hash generated by the host device.

Some examples of the method 600 and the apparatus described herein may further include operations, features, means, or instructions for transmitting, by the host device to the volatile memory, a request for the data, where receiving the data and the first hash associated with the data may be based on transmitting the request.

In some examples of the method 600 and the apparatus described herein, authenticating the data may include operations, features, means, or instructions for comparing at least a portion of the first hash written to the cache of the host device with at least a portion of the second hash based on generating the second hash, and determining whether the portion of the first hash written to the cache of the host device matches the portion of the second hash based on the comparing.

Some examples of the method 600 and the apparatus described herein may further include operations, features, means, or instructions for determining that the data may be invalid based on determining that the portion of the first hash does not match the portion of the second hash, and transmitting an indication to a circuit of the host device to back up the data based on refraining from executing the one or more operations associated with the data.

In some examples of the method 600 and the apparatus described herein, generating the second hash may include operations, features, means, or instructions for generating a third hash using the data and the key that may be accessible to the host device and inaccessible to the volatile memory, and truncating the third hash to generate the second hash.

Some examples of the method 600 and the apparatus described herein may further include operations, features, means, or instructions for assigning the second hash to a line in the cache of the host device, where the data may be authenticated based on assigning the second hash to the line in the cache of the host device.

Some examples of the method 600 and the apparatus described herein may further include operations, features, means, or instructions for executing, by the host device, at least one operation associated with the data before authenticating the data using the first hash and the second hash; and executing, by the host device, a quantity of operations associated with second data concurrent with authenticating the data using the first hash and the second hash, where authenticating, by the host device, the data using the first hash and the second hash may be based on executing the at least one operation associated with the data, or executing the quantity of operations associated with second data, or both.

In some examples of the method 600 and the apparatus described herein, the cryptographic construction of the message authentication code includes a hash-based message authentication code (HMAC).

Some examples of the method 600 and the apparatus described herein may further include operations, features, means, or instructions for determining the key for generating the second hash based on a portion of the cache in which that the data and the first hash may be written to, where generating the second hash may be based on determining the key.

In some examples of the method 600 and the apparatus described herein, the second hash associated with the data may be generated after the data and the first hash may be written to the cache of the host device.

In some examples of the method 600 and the apparatus described herein, the first hash includes a key.

Figure 7:
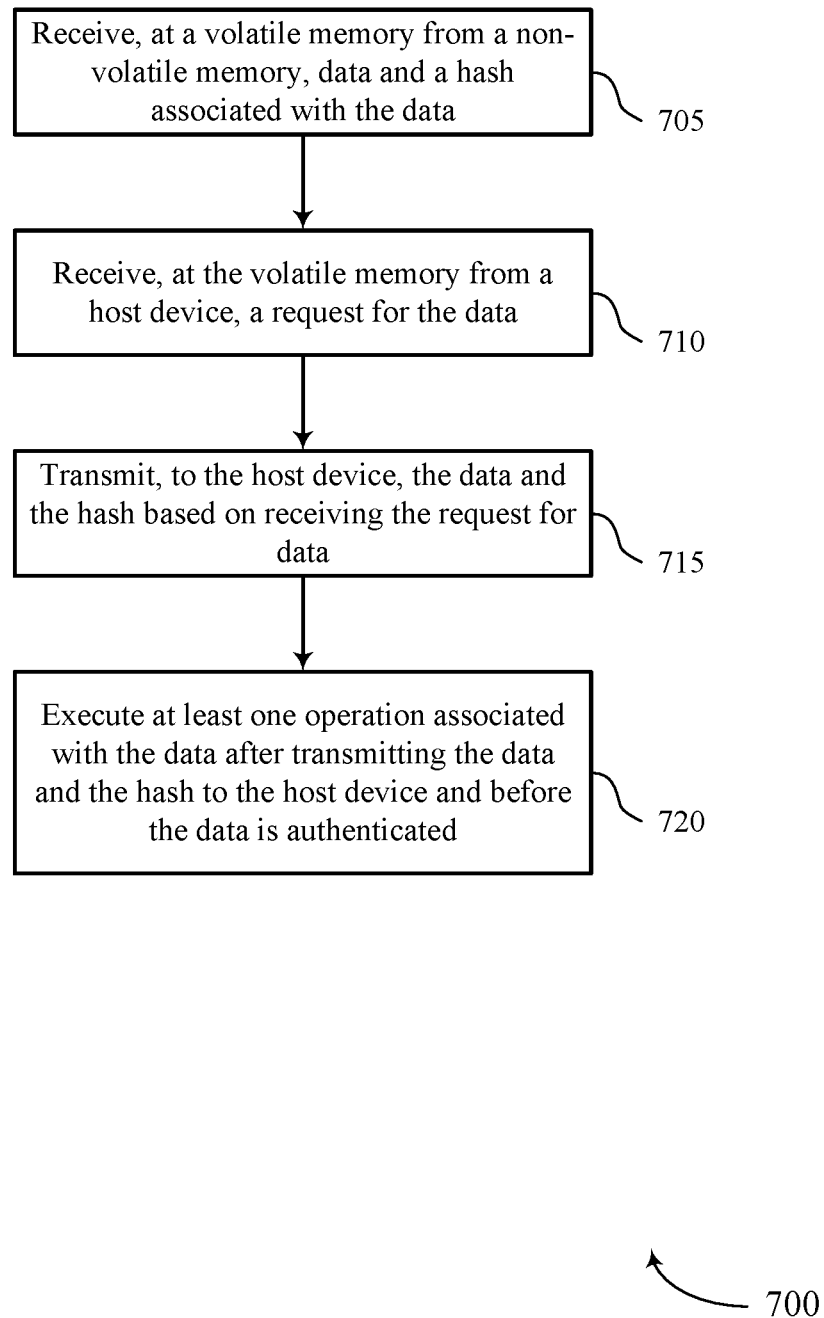

FIG. 7 shows a flowchart illustrating a method or methods 700 that supports safety and security for memory in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive, at a volatile memory from a non-volatile memory, data and a hash associated with the data. The operations of 705 may be performed according to the methods described herein. In some examples, aspects of the operations of 705 may be performed by a reception component as described with reference to FIG. 5.

At 710, the memory device may receive, at the volatile memory from a host device, a request for the data. The operations of 710 may be performed according to the methods described herein. In some examples, aspects of the operations of 710 may be performed by a reception component as described with reference to FIG. 5.

At 715, the memory device may transmit, to the host device, the data and the hash based on receiving the request for data. The operations of 715 may be performed according to the methods described herein. In some examples, aspects of the operations of 715 may be performed by a transmission component as described with reference to FIG. 5.

At 720, the memory device may execute at least one operation associated with the data after transmitting the data and the hash to the host device and before the data is authenticated. The operations of 720 may be performed according to the methods described herein. In some examples, aspects of the operations of 720 may be performed by an execution component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for receiving, at a volatile memory from a non-volatile memory, data and a hash associated with the data, receiving, at the volatile memory from a host device, a request for the data, transmitting, to the host device, the data and the hash based on receiving the request for data, and executing at least one operation associated with the data after transmitting the data and the hash to the host device and before the data is authenticated.

Some examples of the method 700 and the apparatus described herein may further include operations, features, means, or instructions for executing at least one operation associated with second data different than the data, where a threshold quantity of operations associated with the data or the second data may be executed before the data may be authenticated at the volatile memory.

Some examples of the method 700 and the apparatus described herein may further include operations, features, means, or instructions for receiving, from the host device, an indication that the data was authenticated based on transmitting the data and the hash to the host device.

In some examples of the method 700 and the apparatus described herein, the hash includes a hash-based message authentication code (HMAC), and where the data and the hash may be transmitted to the host device for authentication using a key that may be inaccessible to the volatile memory and the non-volatile memory.

In some examples of the method 700 and the apparatus described herein, the data and the hash may be stored at the non-volatile memory prior to being received at the volatile memory, where the data and the hash associated with the data may be received at the volatile memory during a boot sequence associated with a memory device including the volatile memory.

In some examples of the method 700 and the apparatus described herein, the data and the hash associated with the data may be transmitted to the host device based on a change in an operational mode of a memory device including the volatile memory.

In some examples of the method 700 and the apparatus described herein, the non-volatile memory stores a full hash associated with the data, and where the hash received by the volatile memory includes the full hash.

In some examples of the method 700 and the apparatus described herein, the request for data may be received before the data and the hash may be received from the non-volatile memory.

In some examples of the method 700 and the apparatus described herein, the volatile memory may be located in a first memory device different than a second memory device that includes the non-volatile memory.

In some examples of the method 700 and the apparatus described herein, the hash associated with the data includes a key.

In some examples of the method 700 and the apparatus described herein, executing the at least one operation may include operations, features, means, or instructions for executing data received from a cache line of the host device before the data may be authenticated by the host device.

It should be noted that the methods described herein describe possible implementations, and that the operations and the steps may be rearranged or otherwise modified and that other implementations are possible. Further, portions from two or more of the methods may be combined.

An apparatus is described. The apparatus may include a controller including memory configured as a cache, where the controller is configured to receive data including a first hash from a volatile memory and to store the data and the first hash, a first circuit coupled with the controller and configured to generate a second hash associated with the data and to authenticate the data before executing a threshold quantity of operations associated with the data based on the first hash and the second hash, the second hash including a cryptographic construction of a message authentication code, and a second circuit coupled with the first circuit and configured to receive a notification from the first circuit about whether the data could be authenticated.

In some examples, the first circuit may be configured to store a key inaccessible to the volatile memory and to use the key to generate the second hash.

In some examples, the first circuit may be configured to determine the key for generating the second hash based on a portion of the cache that the data and the first hash may be stored in and to generate the second hash based on determining the key.

In some examples, the second hash includes a hash-based message authentication code, and where the first circuit may be configured to authenticate the data by comparing at least a portion of the first hash with at least a portion of the second hash.

In some examples, the notification includes an indication that the data was not authenticated, or where the second circuit may be configured to discard the data and the first hash based on the notification indicating that the data was not authenticated; and where the controller may be configured to transmit a request for second data associated with the first hash from the volatile memory based on the notification.

An apparatus is described. The apparatus may include a host device configured to be coupled with a non-volatile memory and a volatile memory, the host device including a controller configured to cause the apparatus to, write the data and the first hash to a cache of the host device, generate a second hash associated with the data using a key that is accessible to the host device and inaccessible to the volatile memory, the second hash including a cryptographic construction of a message authentication code, and authenticate the data before executing an operation associated with the data using the first hash and the second hash.

Some examples of the apparatus may include a first memory device coupled with the host device, where the first memory device includes the non-volatile memory, and a second memory device coupled with the first memory device and the host device, where the second memory device includes the volatile memory.

Some examples may further include transmit a request for the data from the host device to the volatile memory, where receiving the data and the first hash associated with the data may be based on transmitting the request.

Some examples may further include generating a third hash using the data and the key that may be accessible to the host device and inaccessible to the volatile memory, and truncate the third hash to generate the second hash.

Some examples may further include assigning the second hash to a line in the cache, where the data may be authenticated based on assigning the second hash to the line in the cache.

Some examples may further include executing at least one operation associated with the data before authenticating the data using the first hash and the second hash; execute at least one operation associated with second data before authenticating the data using the first hash and the second hash, and authenticate the data using the first hash and the second hash based on executing a threshold quantity of operations associated with the data, a threshold quantity of operations associated with the second data, or both.

Some examples may further include determining the key for generating the second hash based on a portion of the cache that the data and the first hash may be written to, where generating the second hash may be based on determining the key.

An apparatus is described. The apparatus may include a non-volatile memory, a volatile memory coupled with the non-volatile memory, a controller coupled with the volatile memory and the non-volatile memory, where the controller is configured to cause the apparatus to, receive, at the volatile memory, a request for the data, transmit the data and the hash based on receiving the request for data, and execute at least one operation associated with the data after transmitting the data and the hash and before the data is authenticated.

Some examples may further include executing at least one operation associated with second data different than the data, where a threshold quantity of operations associated with the data or the second data may be executed before the data may be authenticated at the volatile memory.

Some examples may further include receiving an indication that the data was authenticated based on transmitting the data and the hash, where executing at least one operation associated with the data before the data may be authenticated at the volatile memory may be based on transmitting the data and the hash.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    transmitting, by a host device to a memory device, signaling assigning a respective hash to each row of data of a volatile memory or a non-volatile memory of the memory device;
    receiving, by the host device from the volatile memory, data and a first hash assigned to a row of data associated with the data;
    writing, by the host device, the data and the first hash received from the volatile memory to a cache of the host device;
    generating, by the host device, a second hash associated with the data using a key that is accessible to the host device and inaccessible to the volatile memory, wherein generating the second hash comprises:
        generating a third hash using the data and the key that is accessible to the host device and inaccessible to the volatile memory; and
        truncating the third hash to generate the second hash, the second hash comprising a cryptographic construction of a message authentication code;
    authenticating, by the host device and after writing the data and the first hash to the cache of the host device, the data by using the first hash received from the volatile memory and the second hash generated by the host device; and
    executing, based at least in part on authenticating the data, the data directly from the cache of the host device, wherein executing the data comprises executing at least a first operation associated with the host device.

2. The method of claim 1, further comprising:
    transmitting, by the host device to the volatile memory, a request for the data, wherein receiving the data and the first hash associated with the data is based at least in part on transmitting the request.

3. The method of claim 1, wherein authenticating the data comprises:
    comparing at least a portion of the first hash written to the cache of the host device with at least a portion of the second hash based at least in part on generating the second hash; and
    determining whether the portion of the first hash written to the cache of the host device matches the portion of the second hash based at least in part on the comparing.

4. The method of claim 3, further comprising:
    determining that the data is valid based at least in part on determining that the portion of the first hash matches the portion of the second hash, wherein executing at least the first operation is based at least in part on determining that the data is valid.

5. The method of claim 1, further comprising:
    assigning the second hash to a line in the cache of the host device, wherein the data is authenticated based at least in part on assigning the second hash to the line in the cache of the host device.

6. The method of claim 1, further comprising:
    executing, by the host device, at least a second operation associated with the data before authenticating the data using the first hash and the second hash; or
    executing, by the host device, a quantity of operations associated with second data concurrent with authenticating the data using the first hash and the second hash, wherein authenticating, by the host device, the data using the first hash and the second hash is based at least in part on executing at least the second operation associated with the data, or executing the quantity of operations associated with the second data, or both.

7. The method of claim 1, wherein the cryptographic construction of the message authentication code comprises a hash-based message authentication code (HMAC).

8. The method of claim 1, further comprising:
determining the key for generating the second hash based at least in part on a portion of the cache in which that the data and the first hash are written to, wherein generating the second hash is based at least in part on determining the key.

9. The method of claim 1, wherein the second hash associated with the data is generated after the data and the first hash are written to the cache of the host device.

10. The method of claim 1, wherein the first hash comprises a second key.

11. A method, comprising:
receiving, by a memory device from a host device, signaling assigning a respective hash to each row of data of a volatile memory or a non-volatile memory of the memory device;
receiving, at the volatile memory and from the non-volatile memory, data and a hash assigned to a row of data associated with the data;
receiving, at the volatile memory and from the host device, a request for the data and the hash;
transmitting, to the host device, the data and the hash based at least in part on receiving the request for the data and the hash;
executing at least a first operation associated with the data after transmitting the data and the hash to the host device and before the data is authenticated by the host device, wherein execution of at least the first operation comprises:
executing data received from a cache line of the host device before the data is authenticated by the host device; and
receiving, at the volatile memory and from the host device, an indication that the data was authenticated based at least in part on transmitting the data and the hash to the host device.

12. The method of claim 11, further comprising:
executing at least a second operation associated with second data different than the data, wherein a threshold quantity of operations associated with the data or the second data are executed before the data is authenticated at the volatile memory.

13. The method of claim 11, wherein the hash comprises a hash-based message authentication code (HMAC), and wherein the data and the hash are transmitted to the host device for authentication using a key that is inaccessible to the volatile memory and the non-volatile memory.

14. The method of claim 11, wherein the data and the hash are stored at the non-volatile memory prior to being received at the volatile memory, wherein the data and the hash associated with the data are received at the volatile memory during a boot sequence associated with the memory device comprising the volatile memory.

15. The method of claim 11, wherein the data and the hash associated with the data are transmitted to the host device based at least in part on a change in an operational mode of the memory device comprising the volatile memory.

16. The method of claim 11, wherein the non-volatile memory stores a full hash associated with the data, and wherein the hash received by the volatile memory comprises the full hash.

17. The method of claim 11, wherein the request for data is received before the data and the hash are received from the non-volatile memory.

18. The method of claim 11, wherein the volatile memory is located in a first memory device different than a second memory device that comprises the non-volatile memory.

19. The method of claim 11, wherein the hash associated with the data comprises a key.

20. A system, comprising:
one or more controllers comprising memory configured as a cache, wherein the one or more controllers are configured to transmit signaling assigning a respective hash to each row of data of a volatile memory or a non-volatile memory of a memory device, receive data comprising a first hash assigned to a row of data associated with the data from the volatile memory, and store the data and the first hash received from the volatile memory to the cache;
one or more first circuits coupled with the one or more controllers and configured to generate a second hash associated with the data and to authenticate the data after storing the data and the first hash to the cache based at least in part on the first hash and the second hash, the second hash comprising a cryptographic construction of a message authentication code, wherein the one or more first circuits are further configured to:
store a key inaccessible to the volatile memory,
determine the key for generating the second hash based at least in part on a portion of the cache that the data and the first hash are stored in, and
generate the second hash based at least in part on determining the key;
one or more second circuits coupled with the one or more first circuits and configured to receive a notification from the one or more first circuits about whether the data could be authenticated; and
one or more third circuits coupled with the one or more first circuits and configured to execute, based at least in part on authenticating the data, the data directly from the cache, wherein to execute the data, the one or more third circuits are configured to execute at least a first operation.

21. The system of claim 20, wherein the one or more first circuits are further configured to use the key to generate the second hash.

22. The system of claim 20, wherein the second hash comprises a hash-based message authentication code, and wherein the one or more first circuits are configured to authenticate the data by comparing at least a portion of the first hash with at least a portion of the second hash.

23. The system of claim 20, wherein the notification comprises an indication that the data was authenticated, wherein the one or more third circuits are configured to execute at least the first operation based at least in part on the notification indicating that the data was authenticated.

* * * * *